(12) United States Patent
Lauder

(10) Patent No.: US 12,446,546 B2
(45) Date of Patent: Oct. 21, 2025

(54) NATURAL NIPPLE SELF-REGULATING FEEDING SYSTEM AND METHOD OF USE

(71) Applicant: Brandi Lauder, Woodland, PA (US)

(72) Inventor: Brandi Lauder, Woodland, PA (US)

( * ) Notice: Subject to any disclaimer, the term of this patent is extended or adjusted under 35 U.S.C. 154(b) by 144 days.

(21) Appl. No.: 18/356,082

(22) Filed: Jul. 20, 2023

(65) Prior Publication Data

US 2023/0354774 A1 Nov. 9, 2023

Related U.S. Application Data

(63) Continuation-in-part of application No. 17/591,703, filed on Feb. 3, 2022, now abandoned.

(51) Int. Cl.
*A01K 9/00* (2006.01)
(52) U.S. Cl.
CPC ................... *A01K 9/005* (2013.01)
(58) Field of Classification Search
CPC ........................................................ A61J 9/04
See application file for complete search history.

(56) References Cited

U.S. PATENT DOCUMENTS

| | | | | |
|---|---|---|---|---|
| 5,824,012 | A * | 10/1998 | Burchett | A61J 17/00 606/236 |
| 8,985,357 | B1 * | 3/2015 | Strayer | A61J 9/00 |
| 10,206,856 | B1 * | 2/2019 | Scoville | A61J 11/00 |
| 2013/0102997 | A1 * | 4/2013 | Abbassmovahedi | A61J 7/00 604/514 |
| 2014/0051926 | A1 * | 2/2014 | Oates | A61J 7/00 |
| 2017/0056293 | A1 * | 3/2017 | Taylor | A61J 7/00 |
| 2017/0290745 | A1 * | 10/2017 | Wiesman | A61J 17/00 |
| 2018/0360694 | A1 * | 12/2018 | Frisch | A61J 9/04 |

* cited by examiner

*Primary Examiner* — Joshua J Michener
*Assistant Examiner* — Henry Hooper Mudd
(74) *Attorney, Agent, or Firm* — ACKER WOOD IP LAW, LLC; Gwen R. Acker Wood

(57) ABSTRACT

The present invention provides a hand feeding, natural, self-regulating nipple nutritional system and method of use for a baby animal which allows the baby animal to latch onto a surrogate feeding nipple in which the speed of flow of liquid and quantity of liquid, such as milk, is regulated comfortably by the animal. In particular, the invention provides a soft, flexible, highly porous material affixed to a liquid-dispensing vehicle, in which the porous material is saturated with, and serves as a reservoir for, the liquid so that any excess liquid not ingested remains in the porous material. The porous material includes a nipple protrusion at one end to which the baby animal latches onto and suckles from until it is satisfied. The nipple protrusion has a density that is greater than the density of the rest of the porous material, which contributes to the high absorbency of the porous material and closely mimics the feel of a mother's nipple. Thus, the device and method of the invention prevent choking, aspiration and risk of death in baby animals in need of nutritional support.

20 Claims, 1 Drawing Sheet

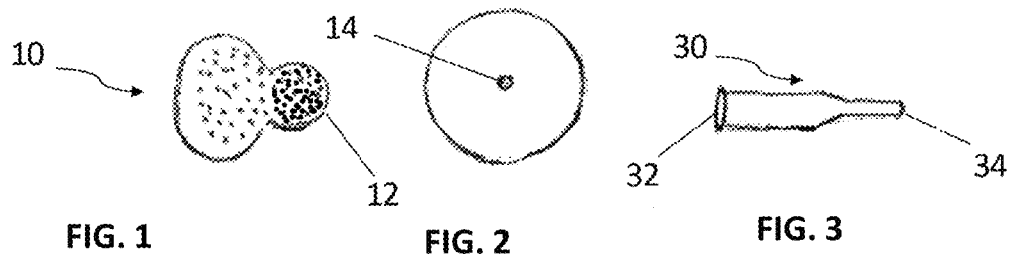
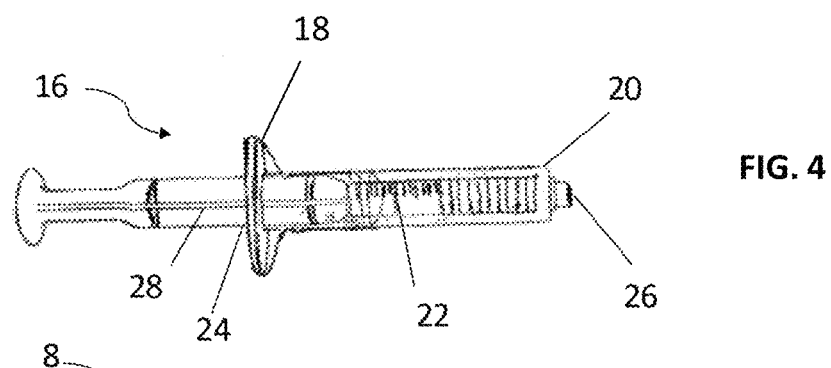
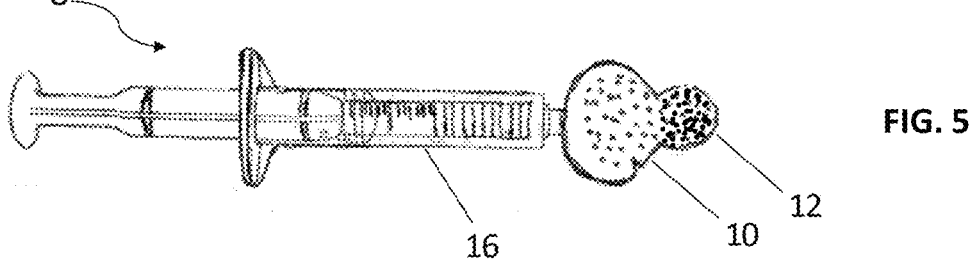
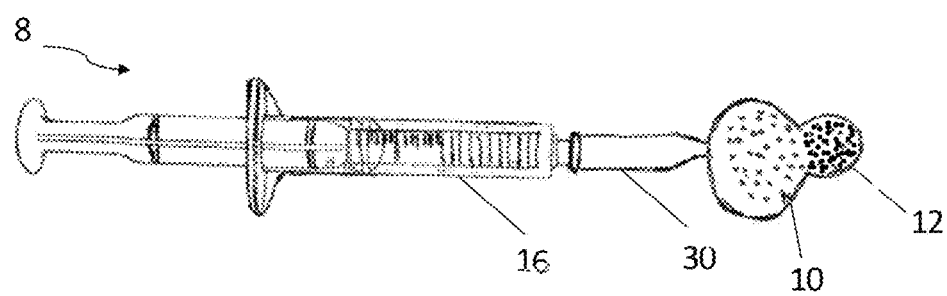

NATURAL NIPPLE SELF-REGULATING FEEDING SYSTEM AND METHOD OF USE

CROSS REFERENCE TO RELATED APPLICATIONS

This application is a continuation-in-part of application Ser. No. 17/591,703, filed Feb. 3, 2022, which is incorporated herein by reference in its entirety.

FIELD OF THE INVENTION

The present invention relates to a system and method to nurse puppies, kittens and other small animals in need of nutritional support.

BACKGROUND OF THE INVENTION

Unfortunately, there are many baby animal lives lost due to a lack of nutritional support due to circumstances such as large litters, underdeveloped newborns, loss of the mother, or abandonment. Current feeding systems on the market make it quite difficult for the newborn animal to latch onto a surrogate mother's nipple because the nipple does not feel natural. In addition, the flow often times is much too slow so that the animal gives up suckling because it is not being satisfied quickly enough. Alternatively, the flow rate may be too fast so that the animal is not able to regulate the right amount of nutrition needed to satisfy its needs and may choke or aspirate when overfed and/or fed too quickly. Indeed, in current feeding systems, aspiration is by far the most common problem causing unnecessary deaths in hand fed baby animals.

In nature, a newborn or baby animal controls, i.e., self-regulates, the amount and speed of flow of milk it ingests at any one nursing session and the animal needs only a little help to get the nursing process started. Mother's milk is by far the best option for any newborn animal, however, when the mother is not available, hand feeding may be the only viable option. If done properly, the newborn then can be reunited with its mother, if she is available, which ideally should be done as soon as possible. There exists a need, therefore, for a hand-feeding nutritional system for newborn animals that allows the animal to latch onto a surrogate feeding nipple that feels natural and in which the speed of flow and the quantity of liquid is self-regulated by the baby animal.

SUMMARY OF THE INVENTION

The present invention fulfills this need by providing a natural nipple self-regulating feeding system and method of use for a baby animal.

In an aspect of the invention, there is provided a natural nipple self-regulating feeding system for a baby animal comprising a porous material having a small cavity on one end and a rounded nipple protrusion comprised of the same porous material but having a greater density of porous material on the opposite end, in which the entire porous material is capable of absorbing up to about thirty times its dry weight of a liquid. The nipple feeding system includes a liquid-dispensing vehicle that has a first end and a second and an interior compartment therebetween. The first end has an entrance port and the second end has an exit port. A movable plunger fits securely in the entrance port of the liquid-dispensing vehicle and the small cavity of the porous material is configured to fit securely over the exit port of the liquid-dispensing vehicle.

In another aspect of the invention, there is provided a method of feeding a baby animal using the natural self-regulating feeding system described above. The method comprises securely fitting the exit port of the liquid-dispensing vehicle into the small cavity of the porous material by twisting the exit port into the small cavity until there is a tight, secure fit; depositing a liquid into the entrance port of the liquid-dispensing vehicle; securely fitting the moveable plunger into the entrance port of the liquid-dispensing vehicle; wetting the nipple protrusion by dipping the nipple protrusion into the same liquid contained in the liquid-dispensing vehicle; placing the nipple protrusion adjacent to a baby animal's mouth until the baby animal latches onto the nipple protrusion and begins to suckle; moving the plunger into the interior of the liquid-dispensing vehicle so that all of the liquid is dispensed into and saturates the entirety of the porous material; and continuing having the baby animal suckle on the nipple protrusion until the baby animal stops suckling, wherein the baby animal self-regulates the speed of flow and the quantity of liquid it ingests.

The system and method of the invention allows a baby animal to self-regulate the speed of flow and the amount of feeding liquid it ingests due to the absorbency of the entirety of the porous material, which is able to hold any excess liquid not ingested by the baby animal therein, thus preventing the baby animal from over suckling on the liquid and possible aspirating the liquid which can be fatal to the baby animal. In addition, the absorbency of the porous material prevents a vacuum from forming in the liquid-dispensing vehicle when the baby animal suckles on the nipple protrusion, thus preventing unwanted intake of air while the baby animal is suckling.

BRIEF DESCRIPTION OF THE DRAWINGS

For the present disclosure to be easily understood and readily practiced, the present disclosure will now be described for purposes of illustration and not limitation in connection with the following figures, in which:

FIG. 1 is a side view of the porous material with nipple protrusion in accordance with an embodiment of the invention;

FIG. 2 is top plan view of the small cavity of the porous material in accordance with an embodiment of the invention;

FIG. 3 is a side view of the extender tip in accordance with an embodiment of the invention;

FIG. 4 is a perspective view of the liquid-dispensing vehicle in accordance with an embodiment of the invention;

FIG. 5 is a perspective view of the natural nipple feeding system with the porous material securely fitted on the exit port of the liquid-dispensing vehicle in accordance with an embodiment of the invention; and FIG. 6 is a perspective view of the natural nipple feeding system with one end of the extender tip securely fitted on the exit port of the porous material of the liquid-dispensing vehicle and the opposite end of the extender tip securely fitted within the small cavity of the porous material in accordance with an embodiment of the invention.

DETAILED DESCRIPTION OF THE INVENTION

A complete understanding of the present invention will be obtained from the following detailed description taken in connection with the accompanying drawing figures, wherein like reference characters identify like parts throughout.

Referring now to FIGS. 1-6, the natural nipple self-regulating feeding system 8 for baby animals is comprised of a soft, flexible, porous material 10 having a small cavity 14 on one end and a nipple protrusion 12 on the opposite end (shown in FIGS. 1 and 2). The nipple protrusion 12 has a density which is greater than the density of the rest of the porous material 10 so that the entirety of the porous material 10 is capable of absorbing up to about thirty times its dry weight of a liquid. The density of the nipple obtrusion 12 is also configured to better mimic the feel of a mother animal's nipple and is sized so that it fits comfortably in a baby animal's mouth.

The invention also comprises a liquid-dispensing vehicle 16 having a first end 18, a second end 20, and an interior compartment 22 in which a feeding liquid for the baby animal is deposited therein (best shown in FIG. 4). At the first end 18 there is an entrance port 24 and at the second end 20 there is an exit port 26. The small cavity 14 of the porous material 10 securely fits onto the exit port 26 of the liquid-dispensing vehicle 16 (best shown in FIG. 5). A moveable plunger 28 inserts into the entrance port 24 of the liquid-dispensing vehicle 16. The invention is not limited to any particular liquid-dispensing vehicle 16 as any suitable disposable liquid-dispensing vehicle 16 may be used, such as, without limitation, a Luer lock tip syringe, a Luer slip lock syringe, or a syringe bucket, so long as it is capable of obtaining a secure, airtight fit with the porous material 10.

In an embodiment of the invention, an extender tip 30 (shown in FIG. 3) having a first end 32 and a second end 34 is inserted securely onto the exit port 26 of the liquid-dispensing vehicle 16 by placing the first end 32 over the exit port 26. The second end 34 of the extender tip 30 then is placed within the small cavity 14 of the porous material 10 (shown in FIG. 5). The extender tip 30 allows for faster saturation of the feeding liquid throughout the porous material 10 and its nipple protrusion 12.

The feeding liquid is deposited in the interior 22 of the liquid-dispensing vehicle 16 through the entrance port 24 and is expelled from the exit port 26 into the porous material 10 and the nipple protrusion 12 by moving the plunger inwardly. The porous material 16 in conjunction with the nipple protrusion 12 is capable of absorbing all of the liquid that is deposited therein, especially because which allows a baby animal to suckle as much liquid as it wants and at its own pace without the risk of over-suckling and possible aspiration of the liquid because any excess liquid not ingested remains within the porous material 10. Any suitable feeding liquid for a baby animal may be deposited in the interior 22 of the liquid-dispensing vehicle 16 including, without limitation, milk, water, juices and combinations thereof.

The porous material 10 may be comprised of any absorbent sponge-like material including, without limitation, natural cellulose sponge, hemp sponge, silk sponge, foam sponge, wool sea sponge, or lamb's wool sponge.

The natural nipple feeding system 8 of the invention is contemplated for use with any baby animal in need of nutritional support, such as, without limitation, dogs, kittens, rabbits and other mammals.

In use, the natural nipple feeding system 8 comprises the following steps. First, the porous material 10 is securely fitted on the exit port 26 of the liquid-dispensing vehicle 16 by placing the exit port 26 into the small cavity 14 of the porous material 10 and then twisting the porous material 16 onto the exit port 26 until there is a tight, secure fit. It is preferred that the porous material 16 be sterilized before use and then used only a few times thereafter. A liquid, such as, without limitation, milk, is deposited into the entrance port 24 of the liquid-dispensing vehicle 16 and then the movable plunger 28 is positioned into the entrance port 24 of the liquid-dispensing vehicle 16. The nipple protrusion 12 of the porous material 10 then is wetted by dipping the nipple protrusion 10 into the same liquid contained in the liquid-dispensing vehicle 16, after which the nipple protrusion 12 is placed adjacent to a baby animal's mouth until the baby animal latches onto the nipple protrusion 12 and begins to suckle. Once the baby animal starts suckling, the plunger 28 is moved inwardly into the interior 22 of the liquid-dispensing vehicle 16 so that all of the liquid is dispensed into and saturates the entirety of the porous material 10. Feeding continues until the baby animal stops suckling. The feeding system 8 of the invention thus allows a baby animal to self-regulate the amount of liquid it ingests due to the absorbency of the porous material 10 which holds all the milk therein, thus effectively serving as a reservoir for the liquid, so that the baby animal is prevented from over suckling on the liquid, i.e., when the baby animal is satisfied, it stops suckling and any excess milk remains in the porous material 10. In this way, the animal also is able to regulate the speed in which it is suckling because the liquid is contained in the porous material 10 and not sent directly into the baby animal's mouth from the liquid-dispensing vehicle 16. In addition, because the baby animal is suckling from the nipple protrusion 12 and not directly from the liquid-dispensing vehicle 16, no vacuum is formed in the feeding system 8, further facilitating suckling by the baby animal.

While the invention has been particularly shown and described with reference to embodiments described above, it will be understood by those skilled in the art that various alterations in form and detail may be made therein without departing from the spirit and scope of the invention, as defined by the appended claims.

What is claimed is:

1. A natural nipple self-regulating feeding system for a baby animal, comprising:
    a nipple consisting of a porous material having a small cavity on a first end and a nipple protrusion on a second end, said nipple protrusion having a density that is greater than the density of the rest of the porous material, wherein the porous material has an absorbency capable of absorbing up to about thirty times its dry weight of a liquid;
    a liquid-dispensing vehicle having a first end and a second end and an interior compartment therebetween, said first end having an entrance port and said second end having an exit port; and
    a moveable plunger which fits into the entrance port of the liquid-dispensing vehicle, wherein the small cavity of the porous material fits securely on the exit port of the liquid-dispensing vehicle,
    wherein the absorbency of the porous material which holds any excess liquid therein allows a baby animal to self-regulate the speed of flow and the amount of liquid it ingests due to the absorbency of the porous material which holds any excess liquid therein which prevents further liquid from entering the baby animal's mouth after the baby animal stops suckling on the liquid which also prevents aspiration of the liquid by the baby animal.

2. The natural nipple feeding system for a baby animal of claim 1, wherein the porous material has a rounded shape.

3. The natural nipple feeding system for a baby animal of claim 1, wherein the liquid is milk and is deposited in the interior of the liquid-dispensing vehicle through the entrance port and is expelled from the exit port into the porous material when the plunger is moved inwardly.

4. The natural nipple feeding system for a baby animal of claim 3, wherein the porous material absorbs all of the liquid that is expelled from the liquid-dispensing vehicle.

5. The natural nipple feeding system for a baby animal of claim 4, wherein the nipple protrusion is sized to fit inside the baby animals' mouth.

6. The natural nipple feeding system for a baby animal of claim 5, wherein the absorbency of the porous material prevents the baby animal from over-suckling on the milk.

7. The natural nipple feeding system for a baby animal of claim 1, wherein the porous material comprises a material selected from natural cellulose sponge, hemp sponge, silk sponge, foam sponge, wool sea sponge, or lamb's wool sponge.

8. The natural nipple feeding system for a baby animal of claim 1, wherein the liquid-dispensing vehicle is a syringe.

9. He natural nipple feeding system for a baby animal of claim 1, wherein the baby animal is selected from a dog, a cat, a rabbit, a hamster, or any other small baby mammal.

10. The natural nipple feeding system for a baby animal of claim 1, further comprising an extender tip having a first end and a second end, said first end capable of fitting securely over the exit port of the liquid-dispensing vehicle and said second end capable of fitting securely into the small cavity of the porous material, wherein the extender tip increases saturation rate of the liquid into entirety of the porous material.

11. A method of feeding a baby animal, said method comprising:
   using the natural nipple self-regulating feeding system of claim 1 to feed a baby animal, said use comprising:
      securely fitting the exit port of the liquid-dispensing vehicle into the small cavity of the porous material by twisting the exit port into the small cavity until there is a tight, secure fit;
      depositing a liquid into the entrance port of the liquid-dispensing vehicle;
      securely fitting the moveable plunger into the entrance port of the liquid-dispensing vehicle;
      wetting the nipple protrusion of the porous material by dipping the nipple protrusion into the same liquid contained in the liquid-dispensing vehicle;
      placing the nipple protrusion adjacent to a baby animal's mouth until the baby animal latches onto the nipple protrusion and begins to suckle on the nipple protrusion;
      moving the plunger inwardly into the interior of the liquid-dispensing vehicle so that all of the liquid is dispensed into and saturates entirety of the porous material; and
      continuing having the baby animal suckle on the nipple protrusion until the baby animal stops suckling, wherein the baby animal is able to self-regulate the speed of flow and the amount of liquid it ingests due to the absorbency of the porous material which holds any excess liquid therein which prevents further liquid from entering the baby animal's mouth after the baby animal stops suckling on the liquid which also prevents aspiration of the liquid by the baby animal.

12. The method of claim 11, wherein the porous material has a rounded shape.

13. The method of claim 11, wherein the absorbency of the porous material prevents a vacuum from forming in the liquid-dispensing vehicle when the baby animal suckles on the nipple protrusion which facilitates suckling by the baby animal.

14. The method of claim 11, wherein the density of the nipple protrusion is configured to mimic the baby animals' mother's natural nipple.

15. The method of claim 14, wherein the nipple protrusion is sized to fit inside the baby animals' mouth.

16. The method of claim 15, wherein absorbency of the porous material prevents the baby animal from over-suckling on the milk.

17. The method of claim 11, wherein the porous material comprises a material selected from natural cellulose sponge, hemp sponge, silk sponge, foam sponge, wool sea sponge, or lamb's wool sponge.

18. The method of claim 11, wherein the liquid-dispensing vehicle is a syringe.

19. The method of claim 11, wherein the baby animal is selected from a dog, a cat, a rabbit, a hamster, or any other small baby mammal.

20. The method of claim 11, further comprising securely fitting a first end of an extender tip onto the exit port of the liquid-dispensing vehicle and securely fitting a second end of the extender tip into the small cavity of the porous material, wherein the extender tip increases saturation rate of the milk into the nipple protrusion.

* * * * *